(12) United States Patent
Pare et al.

(10) Patent No.: US 9,328,715 B2
(45) Date of Patent: May 3, 2016

(54) MODULAR WIND TURBINE HAVING A ROTATING FEATURE AND METHOD OF USE THEREOF

(75) Inventors: Karen Anne Pare, Providence, RI (US); Philip Roger Pare, Providence, RI (US)

(73) Assignee: KKR IP Limited Liability Company, West Warwick, RI (US)

( * ) Notice: Subject to any disclaimer, the term of this patent is extended or adjusted under 35 U.S.C. 154(b) by 419 days.

(21) Appl. No.: 13/603,233

(22) Filed: Sep. 4, 2012

(65) Prior Publication Data

US 2013/0058792 A1 Mar. 7, 2013

Related U.S. Application Data

(63) Continuation of application No. 12/166,687, filed on Jul. 2, 2008, now Pat. No. 8,299,640.

(60) Provisional application No. 60/929,647, filed on Jul. 6, 2007.

(51) Int. Cl.
| | |
|---|---|
| *B63H 1/26* | (2006.01) |
| *F03D 1/02* | (2006.01) |
| *F03D 1/00* | (2006.01) |
| *F03D 1/04* | (2006.01) |
| *F03D 7/02* | (2006.01) |
| *F03D 7/04* | (2006.01) |

(52) U.S. Cl.
CPC ............... *F03D 1/02* (2013.01); *F03D 1/001* (2013.01); *F03D 1/04* (2013.01); *F03D 7/0264* (2013.01); *F03D 7/042* (2013.01); *F05B 2240/121* (2013.01); *F05B 2240/13* (2013.01); *F05B 2240/9152* (2013.01); *F05B 2250/20* (2013.01); *F05B 2250/70* (2013.01); *F05B 2260/50* (2013.01); *F05B 2260/821* (2013.01); *F05B 2260/84* (2013.01); *F05B 2270/32* (2013.01); *F05B 2270/321* (2013.01); *F05B 2270/335* (2013.01); *Y02E 10/723* (2013.01); *Y02E 10/725* (2013.01); *Y02E 10/728* (2013.01)

(58) Field of Classification Search
USPC ................... 416/142, 143, 131, 132 R, 244 R
See application file for complete search history.

(56) References Cited

U.S. PATENT DOCUMENTS

| | | | |
|---|---|---|---|
| 5,062,765 A | 11/1991 | McConachy | |
| 5,252,029 A | 10/1993 | Barnes | |
| 5,520,505 A | 5/1996 | Weisbrich | |
| 6,368,063 B2 * | 4/2002 | Szpur | F03D 3/065 416/197 A |
| 7,525,211 B2 | 4/2009 | Marvin | |
| 8,299,640 B2 * | 10/2012 | Pare et al. | F03D 1/001 290/44 |
| 2006/0273597 A1 | 12/2006 | Rashidi | |
| 2008/0124217 A1 | 5/2008 | Friesth | |
| 2008/0232965 A1 * | 9/2008 | Fraenkel | F03B 17/061 416/85 |

\* cited by examiner

*Primary Examiner* — Ali Naraghi
(74) *Attorney, Agent, or Firm* — Arent Fox LLP

(57) ABSTRACT

A modular multi-turbine unit of fixed toroidal support structures having a rail system designed to allow each of the plurality of turbines to rotate to a most efficient position relative to the wind for generating power, a computer control system capable of positioning each of the plurality of turbines to most effectively generate power from the wind, preventing damage to the turbines, and providing a wind predictive model based on the wind characteristics for the area in which the wind turbine is located.

19 Claims, 11 Drawing Sheets

72 – 37 Spacing

FIG. 8A
FRONT VIEW
FIG. 8B
INSIDE VIEW
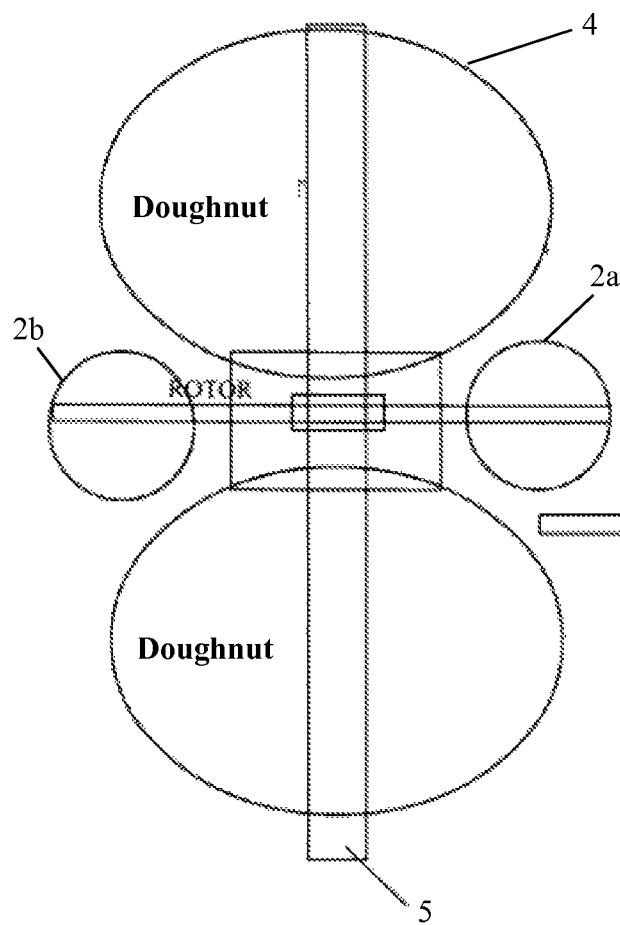
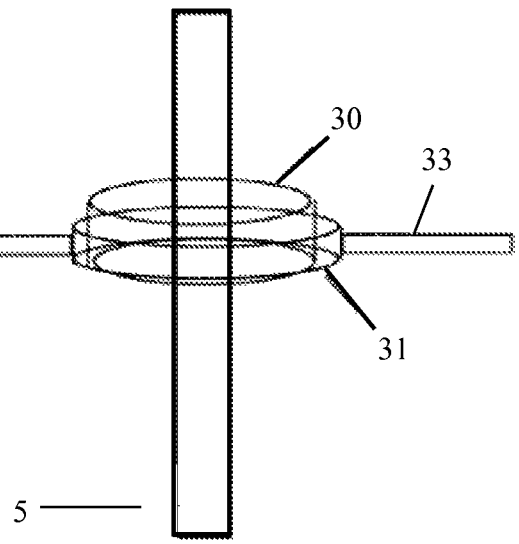
FIG. 8C
TOP VIEW
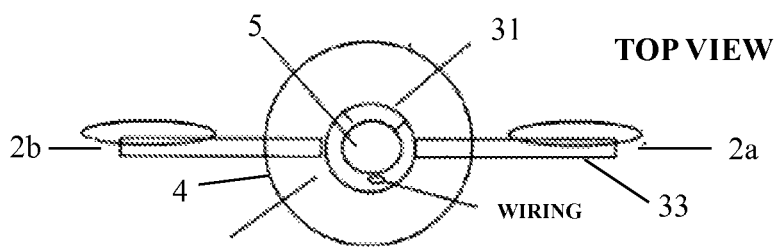
PROPELLER ARMS ARE ATTACHED TO LINEAR MOTION RING AND ROTATE FREELY
ALL WIRING TRAVELS NEXT TO TOWER INSIDE THE RING

MODULAR WIND TURBINE HAVING A ROTATING FEATURE AND METHOD OF USE THEREOF

CLAIM OF PRIORITY UNDER 35 U.S.C. §120

This application is a continuation of application Ser. No. 12/166,687 titled "MODULAR WIND TURBINE, MULTI-TURBINE WIND TURBINE, WIND TURBINE COMPUTER SYSTEM, AND METHOD OF USE THEREOF" filed on Jul. 2, 2008, which is based upon and claims the benefit of priority from the prior U.S. Provisional Application No. 60/929,647 filed on Jul. 6, 2007, titled MODULAR WIND TURBINE, the entire contents of both of which are incorporated herein by reference.

BACKGROUND

1. Field

The invention relates to the field of wind turbine power generation, and in particular to a multi-turbine, multi-directional modular wind turbine that may further include a computer control system that most effectively faces the turbines into the wind.

2. Background of the Technology

Conventional wind turbines have several weaknesses. Conventional one turbine units have large blades that can cause an unpleasant amount of noise during use. In addition to generating unacceptable levels of audible noise, previous wind turbines often lacked versatility and durability and perform below needed performance levels.

In U.S. Pat. No. 5,520,505, which is incorporated herein by reference, a multi-turbine unit was proposed. This unit includes a stacked array of alternating rotating and fixed toroidal modules, wherein the rotating modules have four turbines attached. However, this design appears impractical from an engineering point of view.

SUMMARY

Aspects of the present invention address the needs and weaknesses identified above, as well as others by providing a modular multi-turbine unit of fixed toroidal support structures having a rail system designed to allow each of the plurality of turbines to rotate to a most efficient position relative to the wind for generating power. In one exemplary variation, the multi-turbine unit includes a computer control system capable of positioning each of the plurality of turbines to most effectively generate power from the wind.

The computer system may further include at least one of a radar system, robotic vision, and a wind predictive model based on the wind characteristics for the area in which the wind turbine unit is located.

The wind turbine unit may further include a tower capable of being rotated out of damaging, high speed winds.

BRIEF DESCRIPTION OF THE FIGURES

In the drawings:

FIGS. 8A, 8B and 8C show a conceptual sketch of the ring mounting system.

DETAILED DESCRIPTION

Figure 1:
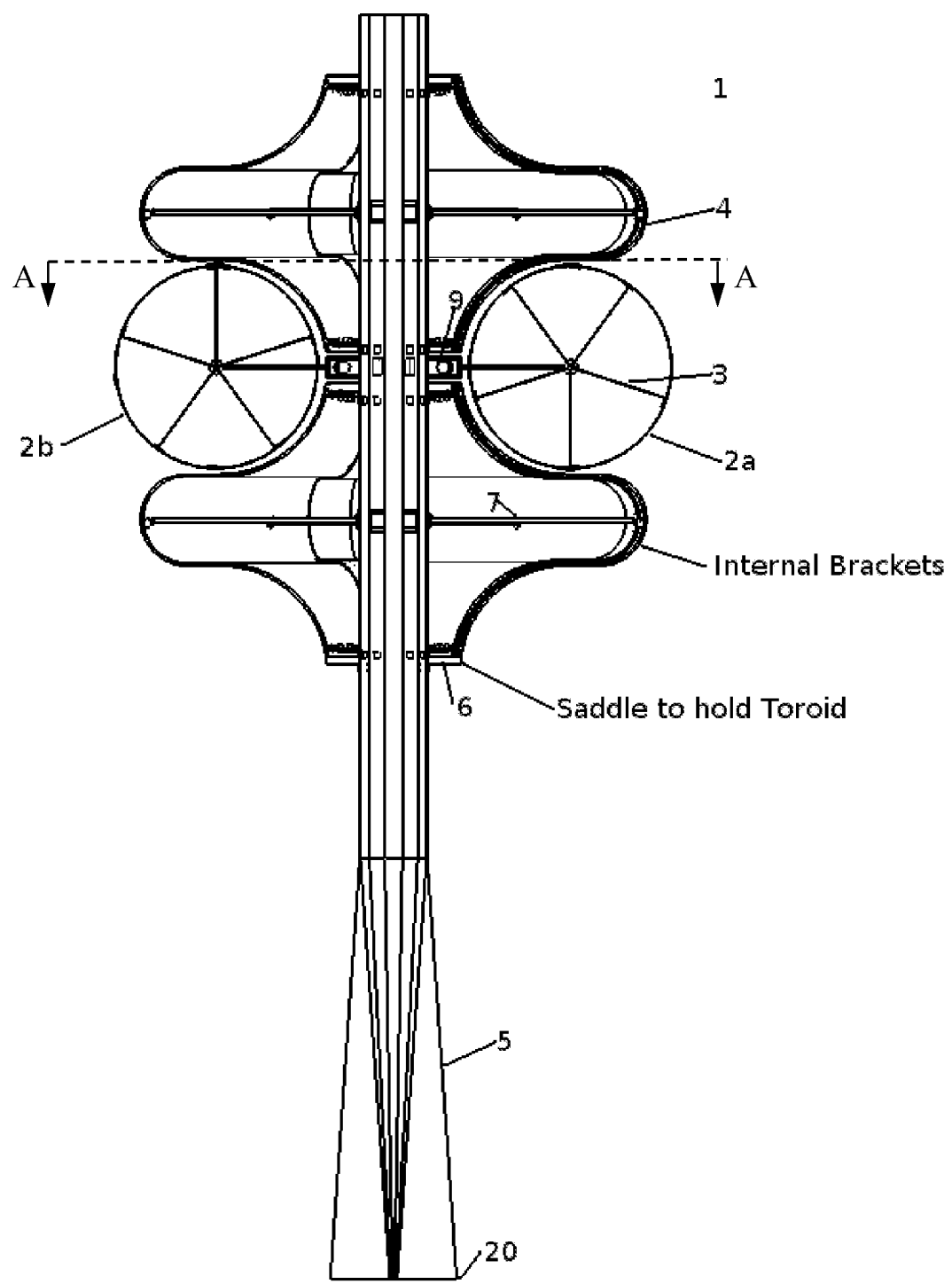
FIG. 1 shows one modular, multi-turbine section of a wind turbine unit attached to a tower, in accordance with aspects of the present invention.

FIG. 1 shows aspects of an exemplary wind turbine unit 1 with two turbines 2a, 2b each having five blades 3. The turbines 2a, 2b are mounted in an inner curve of a donut-type, toroidal shaped support structure 4 mounted to a tower 5. Although the turbines 2a, 2b are depicted as having five blades 3, the turbines 2a, 2b may include two, three, four, or more blades in the present invention. The plurality of turbines ensures that the power generation based on wind can occur almost continuously. In contrast, when a single turbine generator fails, it produces zero power. In aspects of the present invention, if one turbine fails, the other turbines continue to produce power. For example, this may produce around $29/30$, or 96.66% efficiency.

In FIG. 1, the support structure 4 is depicted as being mounted using a lower supporting unit or saddle 6 and internal brackets 7. Other mounting features may be used alone or in connection with at least one of the saddle 6 and brackets 7 depicted in FIG. 1. FIG. 1 shows a tubular tower 5. However, other tower structures may be used such as a lattice type tower or a tower having a plurality of poles.

By using a plurality of smaller turbines 2a, 2b, the turbine blades 3 are smaller than those in a conventional single turbine unit and collectively produce a similar amount of power. This significantly reduces the amount of noise produced by the wind turbine. In addition, the smaller turbines do not require gear boxes. Aspects of the design of the present invention allow the wind turbine unit to switch between acting as a motor and acting as a generator based on the wind speed. For example, the wind turbine unit may switch to acting as a motor in order to deal with high wind speeds to prevent damage to the unit. In another example, the wind turbine unit may bring the turbine blades up to a speed where they are operating at a more efficient level and then switch the wind turbine back to act as a generator.

The support structure 4 may comprise fiberglass or similar material. However, in a preferred embodiment, the toroidal support structure 4 comprises carbon fiber. This structure may have a thickness down to about ¼ inch and yet have the strength to withstand 220 mile per hour winds. The toroidal support structure includes a concave portion and a convex portion. The wind turbine is located proximate to the concave portion of the toroidal support structure.

Figure 11:
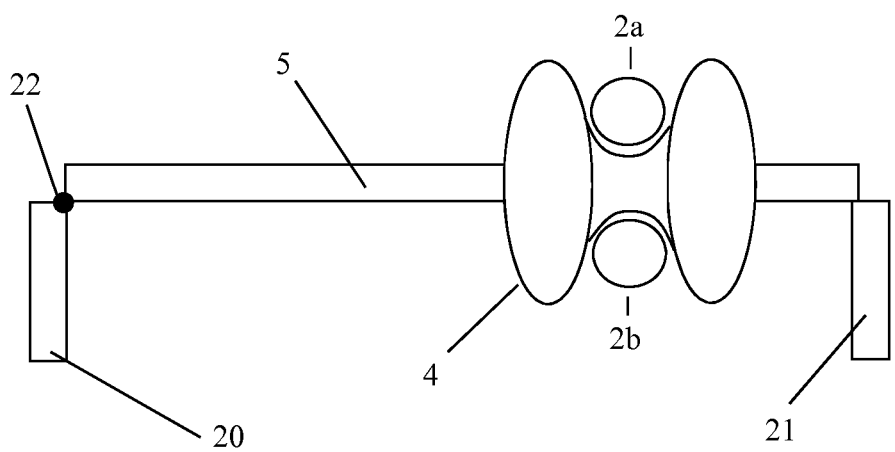
FIG. 11 shows an implementation in which the tower rotates out of damaging, high-speed winds.

The tower in FIG. 1 may include a feature allowing it to rotate out of high winds in order to prevent damage to the wind turbine unit. For example, the tower 5 may rotate 90 degrees toward the ground, as shown in FIG. 11. The rotation may be provided by a hinge 22 in the base 20 of the tower 5. After the tower 5 has rotated toward the ground, the tower may be attached to a securing unit 21 located on the ground. In an exemplary variation, the tower 5 may be locked to the top of a concrete foundation built on the ground, thereby securing the tower 5 parallel to the ground, substantially out of damaging winds.

Although FIG. 1 shows a single multi-turbine section, the pieces are modular so that a plurality of multi-turbine units can be stacked and mounted on a single tower. Each of the modular support structures 4 are mounted to the tower. These support structures do not move. Rails 9 at the inner circumference of the support structures allow for linear movement of the turbines around at least a portion of the inner circumference of the support structure.

Figure 2A:
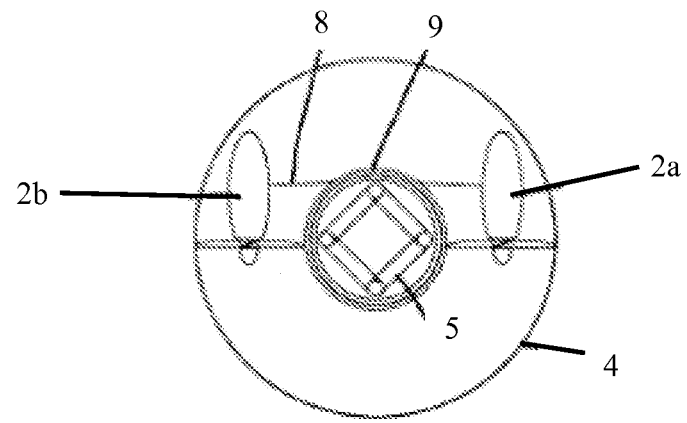
FIGS. 2A and 2B show additional views of one modular section of a wind turbine unit in accordance with aspects of the present invention.

FIG. 2A shows a view of the wind turbine unit taken along line A-A in FIG. 1. This view shows a tower 5 including four poles. In FIG. 2A, the two turbines 2a, 2b, are connected via a connecting piece 8. The turbines are connected to each other and to a rail 9 along the inner curve of the toroidal shaped support structure. The attachment to the rail allows the turbines to rotate around at least a portion of the circular rail 9.

Figure 2B:
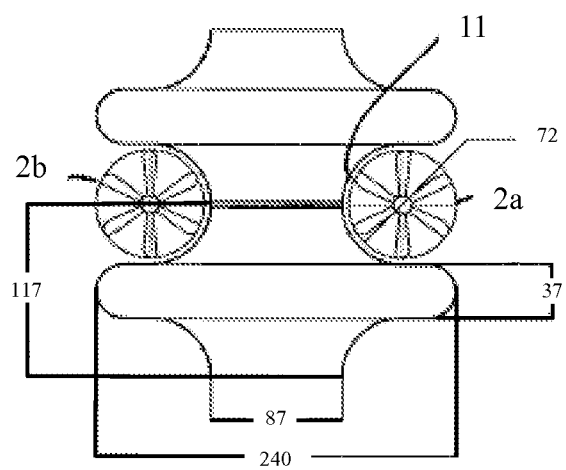

FIG. 2B shows an exemplary variation incorporating a beneficial ratio of spacing between modular units. In the example shown in FIG. 2B, the inner curve 11 housing the turbines has a spacing of about 72, whereas the outer curve 12 between adjacently stacked turbines is about 37. The actual units of linear measure do not matter and can be feet, meters, or cubits. The ratios are the important relationship. This ratio of around 72:37 produces a more effective wind velocity. In addition, the modular unit may have a corresponding height of about 117 corresponding to an outer width or diameter of about 240 and an inner width or diameter of about 87. Thus, the ratio of the height to the inner curve is approximately 117:72 and the ratio of the height to the outer width is approximately 117:240, while the ratio of the outer width of the convex portion to the inner width of the concave portion is approximately 240:87.

Figure 3:
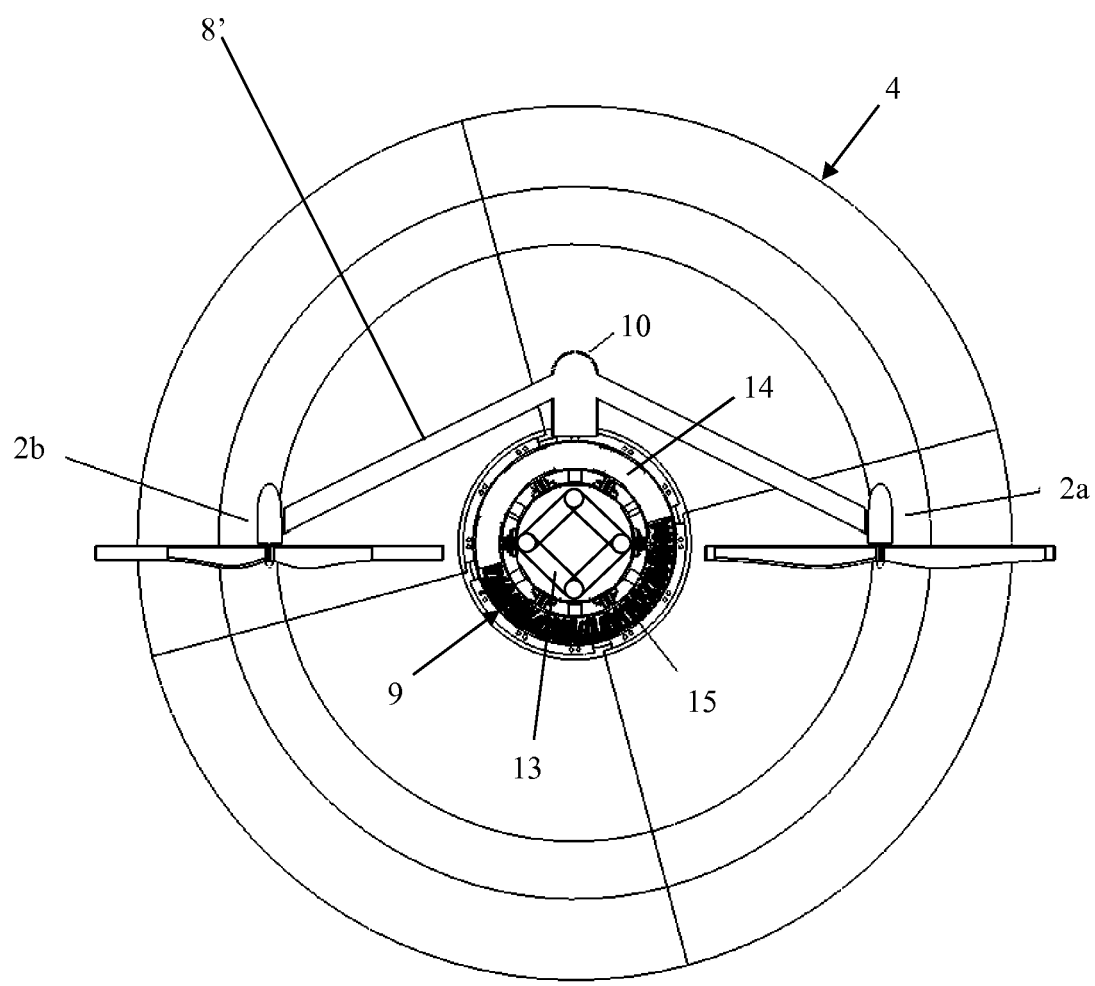
FIG. 3 shows a view of an implementation of aspects of the present invention with an external mounting device.

FIG. 3 shows a connecting piece 8' including an outer mounting device 10. In the embodiment depicted in FIG. 3, the outer mounting device 10 turns the two connected turbines along a section approximately one half of the support structure. The outer mounting device may include a driving mechanism that moves the wind turbines about the tower. Among other things, the driving mechanism may be a motor. The outer mounting device is attached to a rail section of open rail that allows the mounting device to move linearly along the rail 9. This allows the two turbines to integrally rotate approximately 180 degrees in order to face into the wind. In another variation, the two turbines may rotate up to 360 degrees before reversing direction. The other section of the support structure is closed and prevents further rotation of the mounting device. The open and closed sections of the rail provide for openings for cables to extend from the turbines down to an inverter and closed portions that provide the necessary structural support for the weight of the wind turbine unit above the rail. FIG. 3 also shows a four pole tower 13 attaching to the support structure 4. Although a four pole tower is depicted, other tower structures may be used such as a monopole tower.

Figure 4:
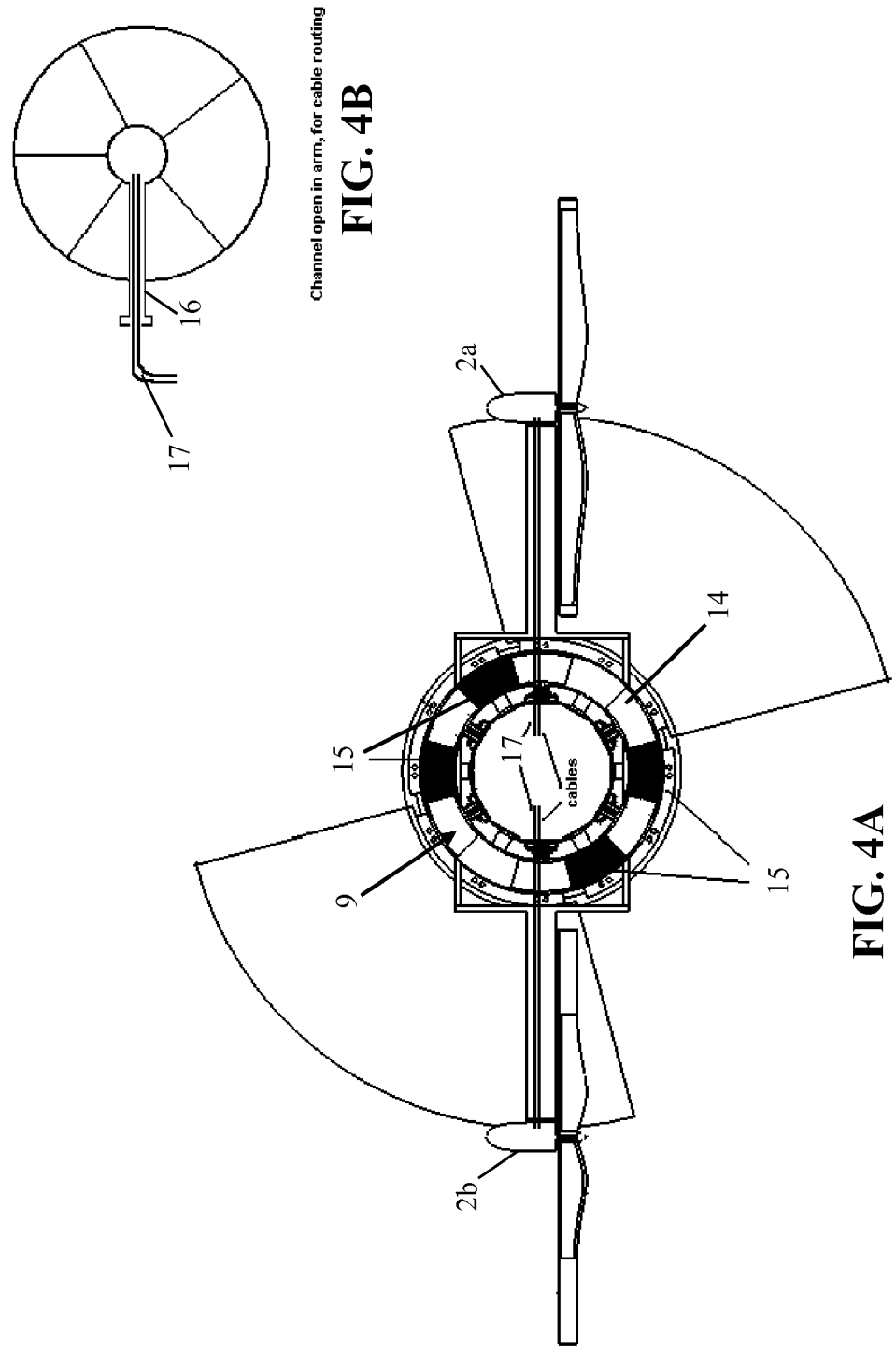
FIGS. 4A and 4B show an alternate implementation of aspects of the present invention in which the turbines are attached independently of each other.

Groups of turbines may be controlled independently or as a group to orient themselves into the wind. FIG. 3 shows a variation in which two turbines are controlled as a group. FIG. 4A shows two turbines that move independent of each other. In another variation larger groups of turbines or the entire tower may rotate into the wind.

FIG. 4A shows an alternate variation in which the turbines are attached to the support structure 4 independently of each other. In this variation, each of the turbines 2a, 2b slides along the rail 9 independent of the movement of the other turbine. Instead of sharing the same side of open rail 14, the turbines are mounted along a section of rail that comprises only a portion of the inner curve of the support structure. For example, in FIG. 4A, two turbines are shown, each having a section of open rail 14 extending for about one fourth of the inner circumference of the support structure. Closed sections 15 of the rail 9 prevent further movement of the turbines 2a, 2b. In FIG. 4A, these closed sections 15 of the rail correspond to the attachments of the tower poles to the rail. However, the closed sections 15 may also be located at other locations. In addition, the open section 14 of rail may extend past the section of the rail that attaches to the tower poles. More turbines may be used in this embodiment than two. For example, three, four, or more turbines may be used.

As shown in FIGS. 4A and 4B, the turbines 2a, 2b are attached to the rail 9 via a slidable attaching piece 16. The cables 17 from the turbine extend through the slidable attaching piece 16 and down through the center of the tower 5. The cables 17 from the turbines 2a, 2b extend through the center of the tower 5 to connect to an inverter at the bottom of the tower 5.

Figure 5:
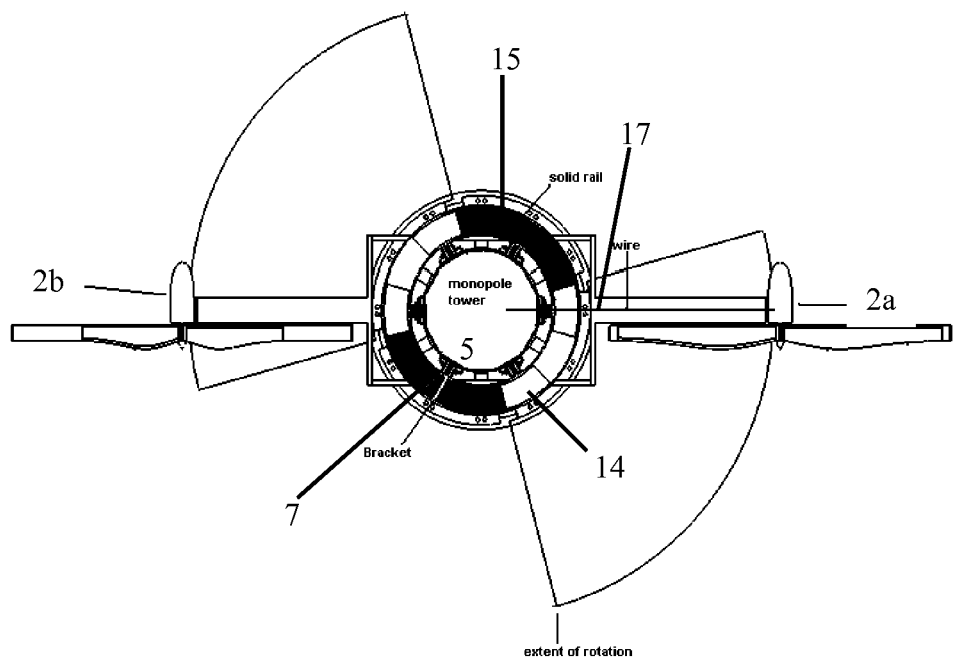
FIG. 5 shows an additional variation of aspects of the present invention in which the turbines are attached independently of each other.

FIG. 5 shows an implementation similar to FIG. 4A, wherein a monopole tower is used instead of a four pole tower. The support structure is attached to the monopole tower with two brackets 7. In this variation, linear motion of the turbines may be allowed along the open rail 14 portions. The extent of the linear motion of the turbines extends to the solid rail 15 portions between the open rail 14 portions.

Figure 6A:
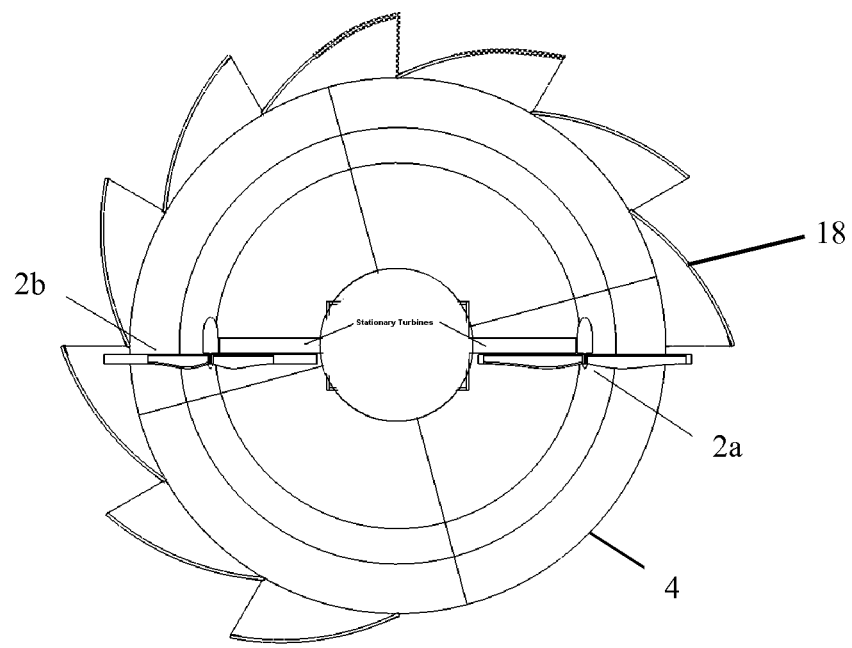
FIGS. 6A and 6B show an variation in accordance with aspects of the present invention including air baffles.
Figure 6B:
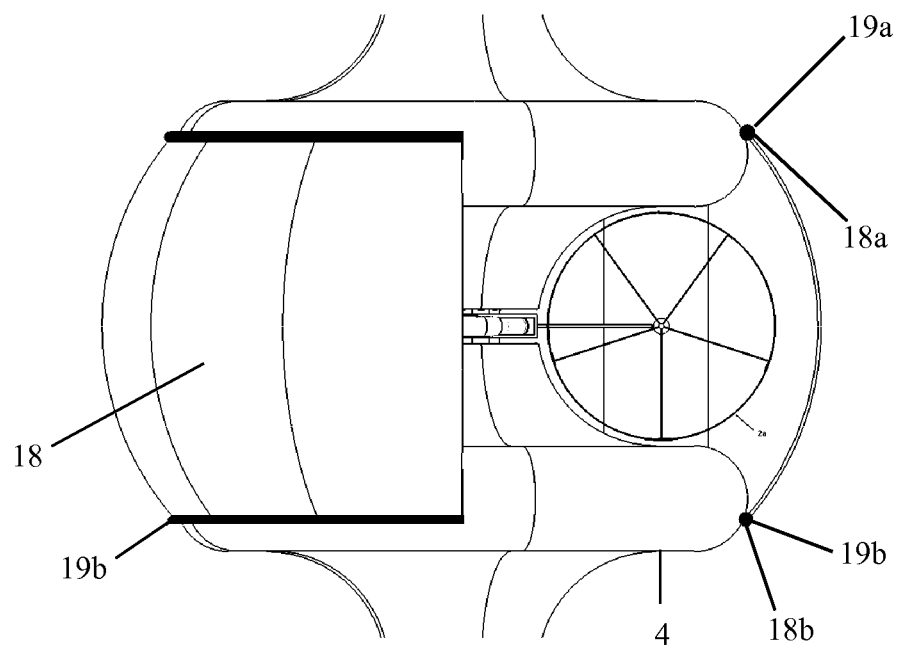

FIGS. 6A and 6B show an alternate implementation that incorporates baffles 18 directing air flow toward the turbines 2a, 2b. In FIG. 6A, the baffles 18 are shown surrounding the portion of the toroidal support structure 4 that houses the turbines 2a, 2b. In one exemplary embodiment, the turbines 2a, 2b may be mounted to the inner circumference of the support structure in a stationary manner and the air baffles 18 may be attached in a rotational manner so that the baffles rotate around the circumference of the support structure 4 such that the baffles 18 capture the air flow of the wind and direct the air flow toward the turbines 2a, 2b. As shown in FIG. 6B, the baffles can be slidably mounted along rails 19a, 19b at the outer curve of the support structure 4. In an exemplary variation, the baffles 18 may include a top portion 18a attached to an outer curve 19a of one support structure and a lower portion 18b attached to the next lower outer curve 19b of the support structure such that the baffle 18 surrounds the outside edge of the inner curve portion of the support structure 4 that houses the turbines 2a, 2b.

Figure 7:
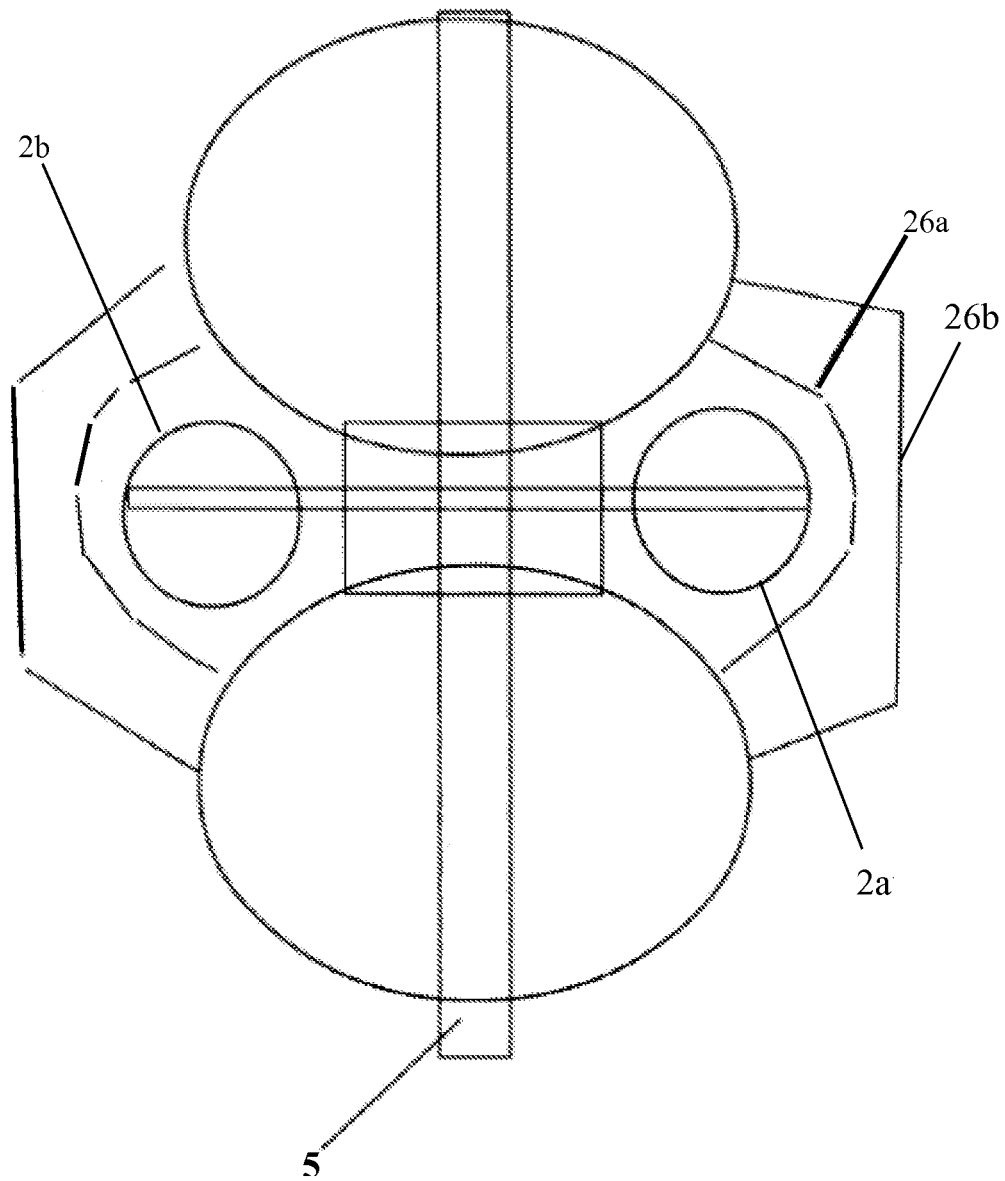
FIG. 7 shows a front view of a conceptual sketch with wind passage area for the turbine being a complete Bernoulli flow passage.

Appropriately shaped members 26a or 26b, shown in FIG. 7, can similarly rotate with turbines 2a, 2b to form a complete Bernoulli passage for the wind to pass through. That is, the members 26a or 26b complete the radially outer side of the passageway to form a flow path closer to a venturi. This can increase power output between 1.6 to 3.0 times that of a wind turbine in the wind by itself.

FIGS. 8A, 8B and 8C present the conceptual view of one possible ring mounting structure. An inner stationary ring 30 may be fixed to tower 5 with, for example, steel I-beams and collars. The inner ring may be a tubular structure, for example, or any such structure to rotatably support an outer ring 31. The outer ring 31 comprises a support structure for the wind turbine units 2a, 2b, and may ride on the inner ring with rollers, similar to a double-row ball bearing. The outer ring 31 may be a caged frame structure, for example, capable of supporting the wind turbine units 2a and 2b with channeled arms 33 while enabling rolling rotation of the outer ring about the inner ring. The appropriate cables, wiring, and controls extend through the channeled arms 33.

In one implementation, the wind turbine unit includes a control system that prevents the cables from bunching or tangling as the turbines orient themselves to the wind. This control system may be mechanical or computer controlled. The control system may allow the turbines to rotate up to 360 degrees before reversing the direction of movement of the turbines.

In one implementation, the wind turbine unit includes a computer control system. The computer control system is capable of providing monitoring up to twenty four hours a day. The computer control system can cause the turbines to be positioned most effectively to generate power from the wind.

This positioning can be accomplished by movement of a turbine along a rail so that the turbine rotates around the toroidal support structure to face the air flow of the wind. This positioning can also include feathering of the blades on a turbine. In certain wind speeds, the most effective position will include facing the turbine most directly into the wind.

As wind speeds increase, the blades may begin to rotate at a speed that could cause damage to the turbine unit. At these speeds, the computer control system would take action to slow the rotation speed of the blades. The blades may be slowed by feathering the blades on the turbine. Feathering the blades includes altering the pitch of the blades on the turbine. The blades may also be slowed by moving the turbine along the rail to a position that does not face directly into the wind.

In one variation the wind turbine control system includes a radar that can detect objects that may come into contact with at least one of the wind turbines. For example, the radar system may detect a flock of birds, bats, or other incoming objects coming towards the turbines. Based on the radar detection, the turbine blades can be slowed or stopped using an arrestor feature. This can occur based upon a manual computer command issued from a user. This can also occur automatically. The computer system may be instructed to stop the turbine blades when interfering objects are detected on the radar system.

In an alternate variation, robotic vision may be employed to detect individual objects that might come into contact with at least one turbine. The robotic vision unit can be combined with the computer system to shut down only the turbines with which the object may come into contact. This allows the wind turbine unit to continue to generate power based on the non-affected turbines in the multi-turbine unit while also preventing damage to wildlife and the turbine blades.

The amount of birds, bats, and other interfering objects varies depending upon location of the wind turbine unit. Therefore, in an area with many interfering objects, a vent or screening can be added to the wind turbine unit that prevents birds, etc. from coming into contact with the turbines' blades.

The computer system may further include a predictive wind model control that rotates the turbines to meet the wind based on a predictive model of wind tracking. Wind is typically not constant. Although air flow may temporarily shift directions, often it will return to the previous direction within a certain amount of time. A predictive model can be created based upon the typical wind characteristics of an area in which the wind turbine is located. The computer system will rotate the wind turbines to face the wind in a most efficient position for generating energy. Then, using the predictive model, the computer system will wait a predetermined amount of time after the wind shifts before rotating the wind turbines to face into the new wind direction. The predetermined amount of time is the amount of time in which the wind typically returns to its previous direction. This prevents the wind turbine from moving to track a change in wind, only to have the wind return to its previous position within a short period of time. By using the predictive model, the wind turbine can be faced most efficiently into the air flow of the wind.

Figure 9:
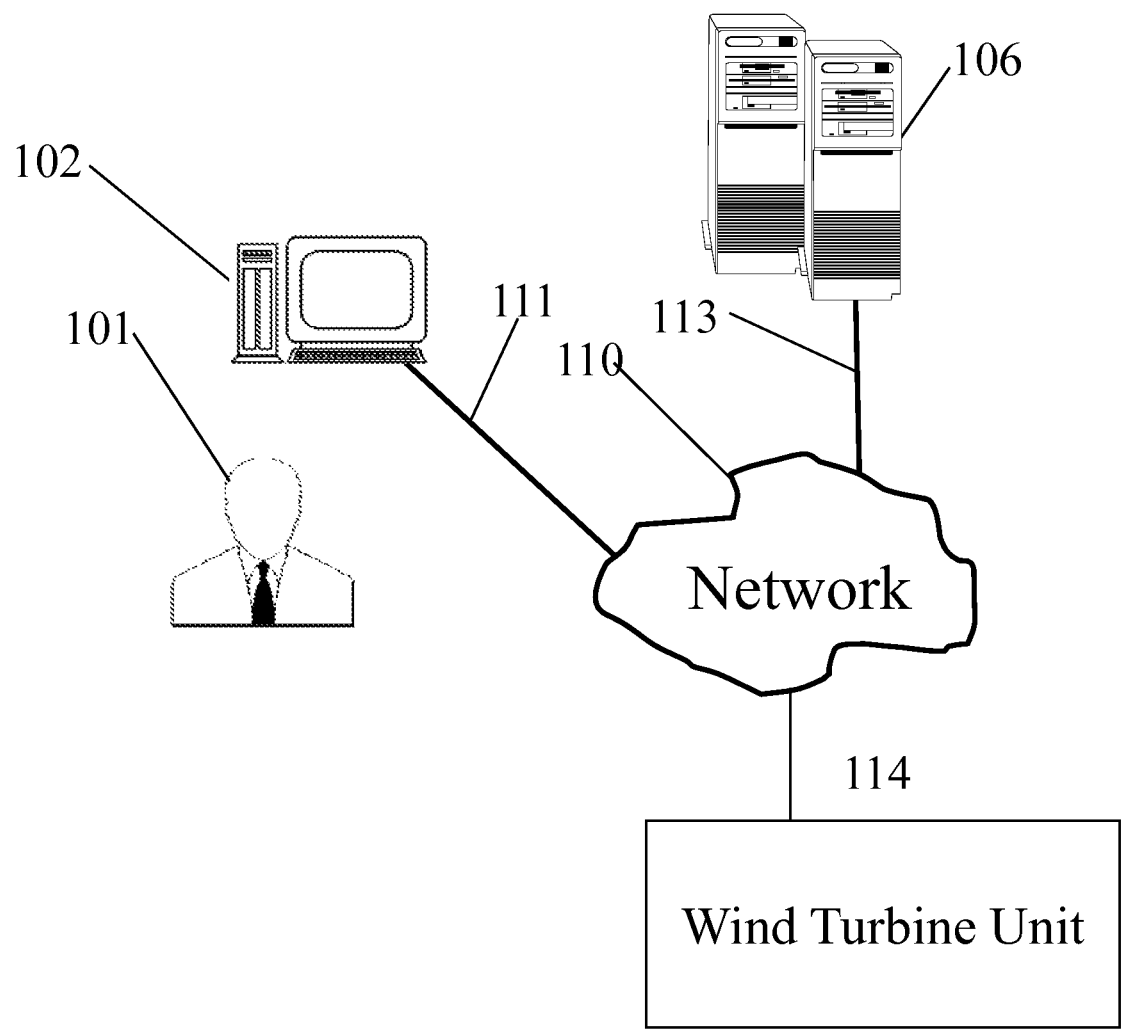
FIG. 9 shows various features of an example computer system for use in conjunction with aspects of the present invention.

FIG. 9 shows various features of an example computer system for use in conjunction with an implementation of aspects of the present invention. Although computer monitoring and control of the wind turbine unit may be automated, in a variation, the computer system may also be accessed by a user 101 to input or access data, monitor wind speeds, monitor radar, to position the turbines, to feather the turbine blades, and to rotate the tower out of the wind, and to perform other steps in accordance with methods of the present invention, such as by using software and other computer features located on a server or other network device 106. Access occurs, for example, via a terminal 102, network (e.g., the Internet) 110, and couplings 111, 113. Access to the wind turbine unit occurs via coupling 114. The terminal 102 may comprise, for example, a personal computer (PC), minicomputer, mainframe computer, microcomputer, telephone device, personal digital assistant (PDA), or other device having a processor and input capability. The server 106 may comprise, for example, a PC, minicomputer, mainframe computer, microcomputer, or other device having a processor and a repository for data or that is capable of accessing a repository of data. Couplings 111, 112 may include wired, wireless, or fiberoptic links.

Figure 10:
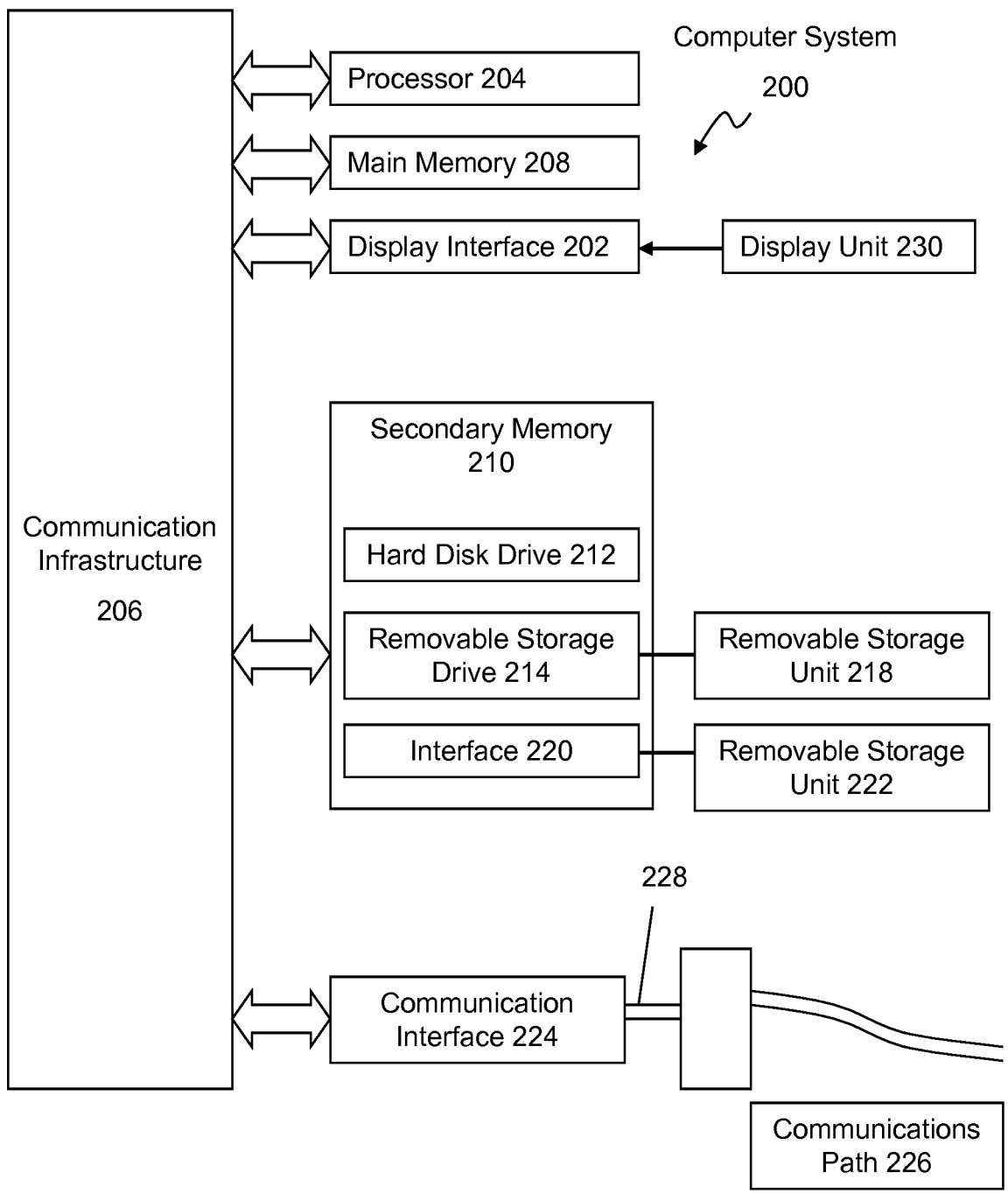
FIG. 10 presents an exemplary system diagram of various hardware components and other features, in accordance with aspects of the present invention.

Aspects of the present invention may be implemented using hardware, software or a combination thereof and may be implemented in one or more computer systems or other processing systems. In one variation, the invention is directed toward one or more computer systems capable of carrying out the functionality described herein. An example of such a computer system 200 is shown in FIG. 10.

Computer system 200 includes one or more processors, such as processor 204. The processor 204 is connected to a communication infrastructure 206 (e.g., a communications bus, cross-over bar, or network). Various software embodiments are described in terms of this exemplary computer system. After reading this description, it will become apparent to a person skilled in the relevant art(s) how to implement the invention using other computer systems and/or architectures.

Computer system 200 can include a display interface 202 that forwards graphics, text, and other data from the communication infrastructure 206 (or from a frame buffer not shown) for display on the display unit 230. Computer system 200 also includes a main memory 208, preferably random access memory (RAM), and may also include a secondary memory 210. The secondary memory 210 may include, for example, a hard disk drive 212 and/or a removable storage drive 214, representing a floppy disk drive, a magnetic tape drive, an optical disk drive, etc. The removable storage drive 214 reads from and/or writes to a removable storage unit 218 in a well-known manner. Removable storage unit 218, represents a floppy disk, magnetic tape, optical disk, etc., which is read by and written to removable storage drive 214. As will be appreciated, the removable storage unit 218 includes a computer usable storage medium having stored therein computer software and/or data.

In other variations, secondary memory 210 may include other similar devices for allowing computer programs or other instructions to be loaded into computer system 200. Such devices may include, for example, a removable storage unit 222 and an interface 220. Examples of such may include a program cartridge and cartridge interface (such as that found in video game devices), a removable memory chip (such as an erasable programmable read only memory (EPROM), or programmable read only memory (PROM)) and associated socket, and other removable storage units 222 and interfaces 220, which allow software and data to be transferred from the removable storage unit 222 to computer system 200.

Computer system 200 may also include a communications interface 224. Communications interface 224 allows software and data to be transferred between computer system 200 and external devices. Examples of communications interface 224 may include a modem, a network interface (such as an Ethernet card), a communications port, a Personal Computer Memory Card International Association (PCMCIA) slot and card, etc. Software and data transferred via communications interface 224 are in the form of signals 228, which may be electronic, electromagnetic, optical or other signals capable of being received by communications interface 224. These signals 228 are provided to communications interface 224 via a communications path (e.g., channel) 226. This path 226 carries signals 228 and may be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 214, a hard disk installed in hard disk drive 212, and signals 228. These computer program products provide software to the computer system 200. The invention is directed to such computer program products.

Computer programs (also referred to as computer control logic) are stored in main memory 208 and/or secondary memory 210. Computer programs may also be received via communications interface 224. Such computer programs, when executed, enable the computer system 200 to perform the features of the present invention, as discussed herein. In particular, the computer programs, when executed, enable the processor 204 to perform the features of the present invention. Accordingly, such computer programs represent controllers of the computer system 200.

In a variation where the invention is implemented using software, the software may be stored in a computer program product and loaded into computer system 200 using removable storage drive 214, hard drive 212, or communications interface 224. The control logic (software), when executed by the processor 204, causes the processor 204 to perform the functions of the invention as described herein. In another embodiment, the invention is implemented primarily in hardware using, for example, hardware components, such as application specific integrated circuits (ASICs). Implementation of the hardware state machine so as to perform the functions described herein will be apparent to persons skilled in the relevant art(s).

In yet another variation, the invention is implemented using a combination of both hardware and software.

Aspects of the present invention have now been described in accordance with the above advantages. It will be appreciated that these examples are merely illustrative of the invention. Many variations and modifications will be apparent to those skilled in the art.

The invention claimed is:

1. A wind power generation unit comprising:
   a mounting frame having a first end and a second end opposite the first end;
   a wind turbine attached to the mounting frame;
   a first base;
   a second base;
   a rotating feature attaching the first base at the first end of the mounting frame, wherein the rotating feature enables the mounting frame to rotate from a first position to a second position, wherein in the first position, the mounting frame extends substantially vertically from the first base and in the second position, the mounting frame is positioned substantially horizontally between the first base and the second base, wherein the first base and the second based are both fixed to the ground both at the first position and the second position; and
   an attachment piece connected to the second base, wherein the attachment piece is configured to lock the second base to the second end of the mounting frame in the second position.

2. The wind power generation unit according to claim 1, wherein the mounting frame rotates approximately 90 degrees between the first position and the second position.

3. The wind power generation unit according to claim 1, wherein the rotating feature comprises a hinge connecting the mounting frame to the first base.

4. The wind power generation unit according to claim 1, wherein the rotating feature rotates the mounting frame to a position substantially parallel with the ground.

5. The wind power generation unit according to claim 1, further comprising:
   a fixed toroidal support structure attached to the mounting frame, the toroidal support structure having a concave portion and a convex portion, wherein the wind turbine is located proximal to the concave portion of the toroidal support structure.

6. The wind power generation unit according to claim 5, wherein the wind turbine travels about at least a portion of the concave portion of the toroidal support structure.

7. The wind power generation unit according to claim 6, further comprising:
   a baffle, wherein the baffle extends about said portion of the concave portion of the toroidal support structure about which the wind turbine travels.

8. The wind power generation unit according to claim 7, further comprising:
   wherein the baffle is fixed about a portion of the concave portion of the toroidal support structure.

9. The wind power generation unit according to claim 7, further comprising:
   wherein the baffle travels about at least a portion of the concave portion of the toroidal support structure.

10. The wind power generation unit according to claim 7, wherein the baffle comprises a concave side proximal to the wind turbine.

11. The wind power generation unit according to claim 7, wherein the baffle surrounds a portion of wind turbine opposite the fixed toroidal support structure.

12. The wind power generation unit accorording to claim 7, further comprising:
   a second wind turbine located proximal to the concave portion of the toroidal support structure, wherein the wind turbine and the second wind turbine are located at a first height on the mounting frame; and a second baffle comprising a concave side positioned proximal to a portion of the second wind turbine opposite the fixed toroidal support structure.

13. The wind power generation unit according to claim 5, further comprising:
   a second turbine located proximate to the concave portion of the toroidal support structure.

14. The wind power generation unit according to claim 13, wherein the wind turbine and the second wind turbine travel about the concave portion of the toroidal support structure independently from each other.

15. The wind power generation unit according to claim 1, wherein the toroidal support structure is modular, the wind power generation unit further comprising:
   a plurality of modular, fixed, toroidal support structures attached to the mounting frame, each toroidal support structure having a concave portion and a convex portion; and
   a wind turbine located proximate to the concave portion of each toroidal support structure, wherein the wind turbines travel about at least a portion of the concave portion of the toroidal support structure.

16. The wind power generation unit according to claim 1, further comprising:
   a central ring surrounding the mounting frame; and
   a first support structure extending radially from the central ring, wherein the first support structure connects the wind turbine to the central ring, wherein the wind turbine travels about at least a portion of the mounting frame.

17. The wind power generation unit according to claim 16, wherein the wind turbine is fixed to the central ring, and wherein the central ring rotates with respect to the mounting frame.

18. The wind power generation unit according to claim 17, wherein the central ring comprises a linear motion ring.

19. A wind power generation unit comprising:
   a mounting frame having a first end and a second end opposite the first end;
   a wind turbine attached to the mounting frame;
   a first base;
   a second base;
   a rotating feature attaching the first base at the first end of the mounting frame, wherein the rotating feature enables the mounting frame to rotate from a first position a second position, wherein in the first position, the mounting frame extends substantially vertically from the first base and in the second position, the mounting frame is positioned substantially horizontally between the first base and the second base; and
   attachment piece connected to the second base, wherein the attachment piece is configured to lock the second base to the second end of the mounting frame in the second position,
   wherein the second base comprises a concrete foundation.

* * * * *